(12) United States Patent
Jung et al.

(10) Patent No.: US 10,812,760 B2
(45) Date of Patent: Oct. 20, 2020

(54) METHOD FOR ADJUSTING IMAGE QUALITY AND TERMINAL AND RELAY SERVER FOR PERFORMING SAME

(71) Applicant: SAMSUNG SDS CO., LTD., Seoul (KR)

(72) Inventors: Ji-Won Jung, Seoul (KR); Hee-Tae Yoon, Seoul (KR); Jun-Ho Kang, Seoul (KR); Sang-Bum Kim, Seoul (KR); Young-Kwang Kim, Seoul (KR); Ho-Sung Ahn, Seoul (KR); Sang-Bum Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/652,891

(22) PCT Filed: May 22, 2019

(86) PCT No.: PCT/KR2019/006142
§ 371 (c)(1),
(2) Date: Apr. 1, 2020

(87) PCT Pub. No.: WO2019/231165
PCT Pub. Date: Dec. 5, 2019

(65) Prior Publication Data
US 2020/0296331 A1 Sep. 17, 2020

(30) Foreign Application Priority Data
May 28, 2018 (KR) .................. 10-2018-0060700

(51) Int. Cl.
*H04N 7/15* (2006.01)
*H04L 29/06* (2006.01)
*H04L 12/26* (2006.01)

(52) U.S. Cl.
CPC .......... *H04N 7/15* (2013.01); *H04L 43/0882* (2013.01); *H04L 65/602* (2013.01); *H04L 65/80* (2013.01)

(58) Field of Classification Search
CPC ............ H04N 7/15; H04L 12/26; H04L 29/06
(Continued)

(56) References Cited

U.S. PATENT DOCUMENTS 6,665,002 B2 * 12/2003 Liu ..................... H04N 7/148
348/14.12
8,789,094 B1 * 7/2014 Singh ................. G06F 3/04842
725/37
(Continued)

FOREIGN PATENT DOCUMENTS

KR 10-2009-0002699 A 1/2009
KR 10-2009-0060274 A 6/2009
(Continued)

OTHER PUBLICATIONS

International Search Report for PCT/KR2019/006142 dated Sep. 9, 2019.

*Primary Examiner* — Melur Ramakrishnaiah
(74) *Attorney, Agent, or Firm* — The PL Law Group, PLLC

(57) ABSTRACT

A terminal for connecting to a conference via a network according to an embodiment of the present invention includes an image acquisition unit configured to acquire each participant image received from a plurality of other terminals connected to the conference, a network monitoring unit configured to monitor performance of the network, an image analyzer configured to analyze the each participant image to acquire one or more of image information, speech information, and quality information of the each participant image when the performance of the network changes, and a quality controller configured to change the quality of at least
(Continued)

some of the participant images according to the analysis result of the each participant image.

28 Claims, 5 Drawing Sheets

(58) Field of Classification Search
USPC .......................................... 348/14.01–14.16
See application file for complete search history.

(56) References Cited

U.S. PATENT DOCUMENTS

2012/0147123 A1    6/2012  Lian et al.
2018/0270452 A1*  9/2018  Moon .................. H04L 65/602

FOREIGN PATENT DOCUMENTS

| KR | 10-0948317 B1 | 3/2010 |
|----|---------------|--------|
| KR | 10-1840594 B1 | 3/2018 |

\* cited by examiner

METHOD FOR ADJUSTING IMAGE QUALITY AND TERMINAL AND RELAY SERVER FOR PERFORMING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/006142 filed on May 22, 2019, which claims priority to the benefit of Korean Patent Application No. 10-2018-0060700 filed in the Korean Intellectual Property Office on May 28, 2018, the entire contents of which are incorporated herein by reference.

TECHNICAL FIELD

Embodiments of the present invention relate to an image quality adjustment technique in a multiparty conference system.

BACKGROUND ART

A video conference service simultaneously displays images transmitted or received by terminals carried by each participant on a screen of each terminal to provide an effect as if the remote participants were in the same location. When image data is transmitted and received by a plurality of terminals, the size of network usage bandwidth in each terminal repeatedly increases or decreases and the size of the total available network bandwidth may be limited depending on various conditions, such as a network environment at each terminal, the number of terminals attending the conference, and the like.

In a conventional video conference service, when the size of the network usage bandwidth reaches its limit, the quality of each of the participant images received from the plurality of terminals is collectively adjusted so that the size of the network usage bandwidth does not exceed the limit. That is, the conventional video conference service uses a method of collectively reducing the quality of each participant image when the size of the network usage bandwidth reaches its limit and otherwise collectively increasing the quality of each participant image.

However, a state of each participant image may differ from each other due to a situation in which, for example, a participant is away from the terminal with the terminal turned on, the size of each person's face included in a participant image is different from each other relative to the total size of the participant image, or several faces appear in one participant image. In such a situation, if the quality of each participant image is collectively adjusted, the quality of the participant image viewed by each participant may be relatively low, which may lower the participants' satisfaction with the video conference service.

SUMMARY

Embodiments of the present invention are intended to provide a means for effectively adjusting quality of each participant image by taking into account changed network performance each time the network performance changes.

According to an exemplary embodiment, there is provided a terminal for connecting to a conference via a network, including: an image acquisition unit configured to acquire each participant image received from a plurality of other terminals connected to the conference; a network monitoring unit configured to monitor performance of the network; an image analyzer configured to analyze the each participant image to acquire one or more of image information, speech information, and quality information of the each participant image when the performance of the network changes; and a quality controller configured to change quality of at least some of the participant images according to an analysis result of the each participant image.

The performance of the network may be a size of total available network bandwidth.

The quality controller may select one or more of the participant images using the analysis result of the each participant image, determine whether a size of network usage bandwidth estimated when a quality of the selected participant image is changed satisfies a quality change condition that corresponds to the changed performance of the network, and change the quality of at least some of the participant images according to the determination result.

The quality controller may calculate a priority score of the each participant image according to the analysis result of the each participant image and select the one or more participant images according to the priority scores.

The quality controller may additionally select another participant image when the size of the network usage bandwidth does not satisfy the quality change condition, and collectively change the quality of already selected participant images when the size of the network usage bandwidth satisfies the quality change condition.

The image information may include one or more of a number of participant faces included in the participant image, a ratio of a size of a participant face included in the participant image to a total size of the participant image, and a degree of movement of the participant image.

The speech information may include one or more of whether a participant included in the participant image is currently uttering and an utterance frequency of a participant included in the participant image.

According to another exemplary embodiment, there is provided a relay server for connecting via a network to a plurality of terminals for a connection to a conference, including: an image acquisition unit configured to acquire each participant image from the plurality of terminals connected to the conference; a network monitoring unit configured to acquire information on performance of the network; an image analyzer configured to analyze the each participant image to acquire one or more of image information, speech information, and quality information of the each participant image when the performance of the network changes; and a quality controller configured to change quality of at least some of the participant images according to an analysis result of the each participant image.

The performance of the network may be a size of total available network bandwidth.

The quality controller may select one or more of the participant images using the analysis result of the each participant image, determine whether a size of network usage bandwidth estimated when a quality of the selected participant image is changed satisfies a quality change condition that corresponds to the changed performance of the network, and change the quality of at least some of the participant images according to the determination result.

The quality controller may calculate a priority score of the each participant image according to the analysis result of the each participant image and select the one or more participant images according to the priority scores.

The quality controller may additionally select another participant image when the size of the network usage bandwidth does not satisfy the quality change condition, and collectively change the quality of already selected participant images when the size of the network usage bandwidth satisfies the quality change condition.

The image information may include one or more of a number of participant faces included in the participant image, a ratio of a size of a participant face included in the participant image to a total size of the participant image, and a degree of movement of the participant image.

The speech information may include one or more of whether a participant included in the participant image is currently uttering and an utterance frequency of a participant included in the participant image.

According to still another exemplary embodiment, there is provided a method of adjusting image quality, which is performed in a terminal connected to a conference via a network, including: acquiring each participant image received from a plurality of other terminals connected to the conference; monitoring performance of the network; analyzing the each participant image to acquire one or more of image information, speech information, and quality information of the each participant image when the performance of the network changes; and changing quality of at least some of the participant images according to an analysis result of the each participant image.

The performance of the network may be a size of total available network bandwidth.

The changing of the at least some of the participant images may include selecting one or more of the participant images using the analysis result of the each participant image, determining whether a size of network usage bandwidth estimated when a quality of the selected participant image is changed satisfies a quality change condition that corresponds to the changed performance of the network, and changing the quality of at least some of the participant images according to the determination result.

The selecting of the participant images one by one may calculate a priority score of the each participant image according to the analysis result of the each participant image and select the one or more participant images according to the priority scores.

The changing of the quality of at least some of the participant images according to the determination result may additionally select another participant image when the size of the network usage bandwidth does not satisfy the quality change condition, and collectively change the quality of already selected participant images when the size of the network usage bandwidth satisfies the quality change condition.

The image information may include one or more of a number of participant faces included in the participant image, a ratio of a size of a participant face included in the participant image to a total size of the participant image, and a degree of movement of the participant image.

The speech information may include one or more of whether a participant included in the participant image is currently uttering and an utterance frequency of a participant included in the participant image.

According to yet another exemplary embodiment, there is provided a method of adjusting image quality, which is performed by a relay server connected via a network to a plurality of terminals for a connection to a conference, including: acquiring each participant image from the plurality of terminals connected to the conference; acquiring information on performance of the network; analyzing the each participant image to acquire one or more of image information, speech information, and quality information of the each participant image when the performance of the network changes; and changing quality of at least some of the participant images according to an analysis result of the each participant image.

The performance of the network may be a size of total available network bandwidth.

The changing of the at least some of the participant images may include selecting one or more of the participant images using the analysis result of the each participant image, determining whether a size of network usage bandwidth estimated when a quality of the selected participant image is changed satisfies a quality change condition that corresponds to the changed performance of the network, and changing the quality of at least some of the participant images according to the determination result.

The selecting of the participant images one by one may calculate a priority score of the each participant image according to the analysis result of the each participant image and select the one or more participant images according to the priority scores.

The changing of the quality of at least some of the participant images according to the determination result may additionally select another participant image when the size of the network usage bandwidth does not satisfy the quality change condition, and collectively change the quality of already selected participant images when the size of the network usage bandwidth satisfies the quality change condition.

The image information may include one or more of a number of participant faces included in the participant image, a ratio of a size of a participant face included in the participant image to a total size of the participant image, and a degree of movement of the participant image.

The speech information may include one or more of whether a participant included in the participant image is currently uttering and an utterance frequency of a participant included in the participant image.

According to embodiments of the present invention, when performance of a network changes, each participant image is analyzed to calculate a priority score of each participant image and a participant image is determined to be a target for quality change according to the priority score, so that a target for allocation/collection of network bandwidth can be more efficiently selected.

In addition, according to embodiments of the present invention, the quality of all participant images is not collectively changed, but a priority score of each participant image is calculated and the quality of some of the participant images is collectively changed by taking into account changed network performance and the priority score each time the network performance changes, so that it is possible to provide a high-quality video conference service to each participant in various situations of changing network performance.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
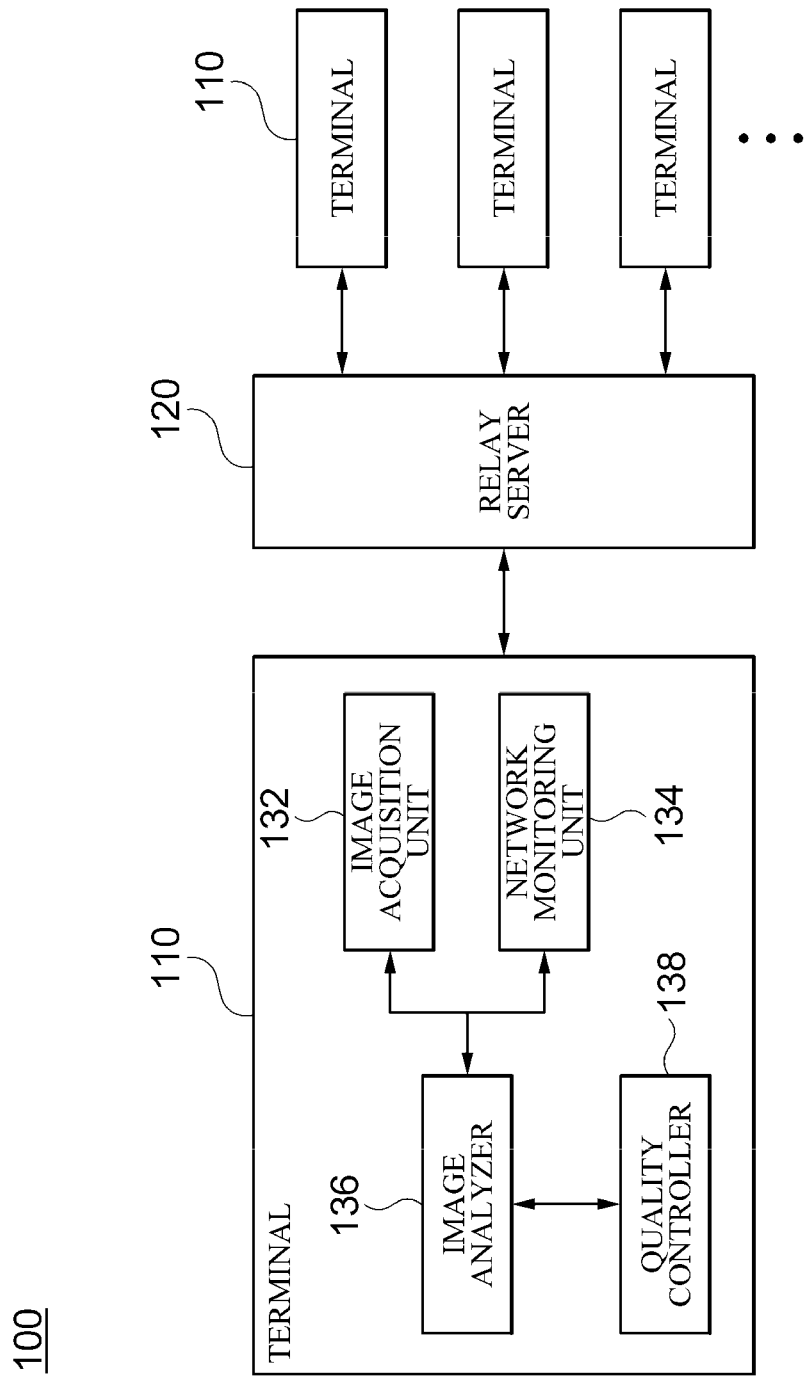
FIG. 1 is a block diagram illustrating a detailed configuration of a conference system 100 according to a first embodiment of the present invention.

FIG. 1 is a block diagram illustrating a detailed configuration of a conference system 100 according to a first embodiment of the present invention.

The conference system according to embodiments of the present invention is to provide a video conference service between a plurality of participants, and includes a plurality of terminals 110 and a relay server 120. In the present embodiments, the video conference service refers to a service that provides functions, such as voice/video call, document sharing, screen sharing, sharing of writing, and the like between a plurality of participants, through a virtual space. The relay server 120 (or a separate conference server) may set up a conference, for example, in response to a request from a manager or a conference host and provide a web service for accessing to the conference. Here, the conference may be, for example, a web conference, but is not limited thereto, and any environment that allows a plurality of participants to share their voice and video with each other for communication may be a conference in accordance with the present embodiments.

The terminals 110 may be devices possessed by participants attending the conference and may include, for example, a desktop computer, a notebook computer, a smartphone, a tablet PC, and the like. For example, the terminals 100 may request the relay server 120 to connect to the conference according to an input of the participant and each receive a participant image of the other terminal 110 connected to the conference from the relay server 120 at the time of connecting to the conference. Here, the participant image may include audio data related to the participant's speech, as well as video data related to the participant's face and a document, a screen, or writing held or pointed at by the participant.

As an example, terminal #1 may receive a video of participant #2 acquired by terminal #2, a video of participant #3 acquired by terminal #3, and a video of participant # N acquired by terminal # N from the relay server 120.

The terminal 110 may simultaneously display the received videos of each participant on a screen and accordingly, a user (e.g., participant #1) of the terminal 110 may feel as if he/she were at the same place with other remote participants.

In one example, the terminal 110 may display a virtual conference room image on a screen and synthesize each participant image on the screen. As another example, the terminal 110 may extract the face part of each participant from each participant image and arrange the extracted face part in a region set in the screen. As such, the terminal 110 may simultaneously display each participant image on the screen through various methods. However, the manner in which the terminal 110 displays each participant image on the screen, a screen layout, a screen background, and the like are not particularly limited. Also, each terminal 110 may output the same screen by sharing the screen including each participant image with each other, but is not limited thereto, and may output different types of screens. In addition, when some of the participants make utterances, each terminal 110 may output the utterance through a speaker provided in the corresponding terminal 110 while displaying a screen including each participant image.

The relay server 120 is a device that relays data related to a video conference service between the terminals 110. The relay server 120 may be connected to each terminal 110 via a network (not shown), and may relay the participant image including video data, audio data, and the like of the participant between the terminals 110. Each of the terminals 110 may transmit the participant image of the terminal 110 to the relay server 120 and receive the participant image of each of the other terminals 110 from the relay server 120.

As such, when the plurality of terminals 110 transmit and receive data, the amount of network bandwidth used in each terminal 110 may be repeatedly increased or decreased, and the total network bandwidth available for the conference service may also vary depending on various conditions, such as a network environment of each terminal 110, the number of terminals 110 participating in the conference, and the like. In addition, as described above, a state of each participant image may differ from each other due to a situation in which a participant is away from the terminal 110 with the terminal 110 turned on, the size of each person's face included in a participant image is different from each other relative to the total size of the participant image, or several faces appear in one participant image. In such a situation, if the quality of all the participant images is collectively adjusted, the participants' satisfaction with the video conference service may be low.

Therefore, in the present embodiments, each time network performance changes, the quality of each participant image may be effectively adjusted in consideration of the changed network performance.

FIG. 1 illustrates an example of adjusting the quality of a participant image in each terminal 110 according to the first embodiment. However, the subject that adjusts the quality of the participant image is not limited to the terminal 110, and such quality adjustment may be made at the relay server 120. Hereinafter, the example of adjusting the quality of the participant image in the terminal 110 will be described in more detail with reference to FIG. 1, and an example of adjusting the quality of the participant image in the relay server 120 will be described below with reference to FIG. 2.

Referring to FIG. 1, each of the terminals 110 includes an image acquisition unit 132, a network monitoring unit 134, an image analyzer 136, and a quality controller 138.

The image acquisition unit 132 acquires each participant image received from a plurality of other terminals 110 connected to a conference. The image acquisition unit 132 may receive each participant image of the other terminals 110 from the relay server 120 as the terminals 110 are connected to the conference via the relay server 120.

The network monitoring unit 134 monitors the performance of the network to which the terminal 110 is connected. The network monitoring unit 134 may periodically (e.g., once per 30 seconds) monitor the performance of the network for uplink and downlink of the terminal 110. Here, the performance of the network may mean, for example, the size of the total available network bandwidth.

The image analyzer 136 analyzes each participant image to acquire one or more of image information, speech information, and quality information of the each participant image when the performance of the network changes. For example, the image analyzer 136 may analyze each participant image to acquire one or more of the image information, the speech information, and the quality information of the each participant image when the size of the total available network bandwidth increases or decreases from its current value by more than a set value.

Here, the image information may include, for example, one or more of the number of participant faces included in the participant image, the ratio of the size of the participant face included in the participant image to the total size of the participant image, and the degree of movement of the participant image. Also, the speech information may include, for example, one or more of whether or not the participant included in the participant image is currently uttering and an utterance frequency of the participant included in the participant image while the terminal corresponding to the participant image is connected to the conference. In addition, the quality information may include, for example, a resolution of each participant image.

The image analyzer 136 may acquire the image information and quality information of each participant image through various image processing techniques, such as a facial feature point detection algorithm, a human recognition algorithm, an image motion detection algorithm, and the like, and may acquire the speech information of each participant image through various voice recognition techniques. The image analyzer 136 may acquire the image information, speech information, and quality information of each participant image through various methods generally known in the art to which the present invention pertains. A specific method of acquiring the image information, the speech information, and the quality information is not particularly limited.

The quality controller 138 changes the quality of at least some of the participant images according to an analysis result of each participant image. Specifically, the quality controller 138 may select one or more of the participant images according to the analysis result of each of the participant images, determine whether a set quality change condition is satisfied when the quality of the selected participant image is changed, and change the quality of at least some of the participant images according to the determination result. In this case, the quality controller 138 may calculate a priority score of the each participant image and select one or more participant images by taking into account the priority scores. Here, the priority score is a value that quantifies the necessity of quality change for each participant image, and it may be considered that the quality of the participant image with a higher priority score needs to be changed first.

First, the quality controller 138 may sort the respective participant images according to the priority scores and select one or more participant images from among the participant images in the sorted order.

In one example, when the size of the total available network bandwidth decreases from the current size, the quality controller 138 may sort the participant images in ascending order according to the priority scores and select the participant images one by one according to the sorted order.

In another example, when the size of the total available network bandwidth increases from the current size, the quality controller 138 may sort the respective participant images in descending order according to the priority scores and select the participant images one by one according to the sorted order. However, for convenience of description, the quality controller 138 is described herein as selecting the participant images one by one according to the priority scores but is not limited thereto. The quality controller 138 may select multiple participant images at once according to the priority scores.

Then, each time the quality controller 138 selects the participant image, the quality controller 138 determines whether the size of the network usage bandwidth estimated when the quality of the already selected participant images is changed satisfies a quality change condition that corresponds to the changed performance of the network, and changes the quality of at least some of the participant images according to the determination result.

In one example, in a case where the size of the total available network bandwidth decreases from the current size, each time the quality controller 138 selects the participant image, the quality controller 138 may determine whether the size of the network usage bandwidth estimated when the quality of the already selected participant images is reduced satisfies the quality change condition that corresponds to the changed performance of the network. Here, the quality change condition is a criterion for determining whether to change the quality of each participant image, and may include, for example, the following first and second conditions.

First condition: whether the size of the network usage bandwidth falls within the total size of currently available network bandwidth (first threshold)

Second condition: whether the size of the network usage bandwidth is greater than or equal to a value (second threshold) that is less than the total size of currently available network bandwidth In this case, the quality change condition may vary depending on the total size of currently available network bandwidth. For example, assuming that the total size of currently available network bandwidth decreases from 2 Mbps to 1.5 Mbps, each time the quality controller 138 selects the participant image, the quality controller 138 may determine whether the size of the network usage bandwidth estimated when the quality of the already selected participant images is reduced satisfies the first condition (i.e., whether the estimated size of the network usage bandwidth falls within 1.5 Mbps) and the second condition (i.e., whether the estimated size of the network usage bandwidth is greater than or equal to 1.2 Mbps that is 0.3 Mbps less than 1.5 Mbps). The quality controller 138 may additionally select another participant image (e.g., the next participant image of the last selected participant image) when the estimated size of the network usage bandwidth does not satisfy the quality change conditions, and may collectively change the quality of the already selected participant images when the estimated size of the network usage bandwidth satisfies the quality change conditions. In the above example, when the estimated size of the network usage bandwidth is 1.8 Mbps, the size of the network usage bandwidth does not satisfy the quality change conditions, and thus the quality controller 138 may select the next participant image of the last selected participant image and then newly estimate the size of the network usage bandwidth that would be obtained when the quality of the already selected participant images is reduced. As such, when the newly estimated size of the network usage bandwidth is 1.3 Mbps, the size of the network usage bandwidth satisfies the quality change conditions, and thus the quality controller 138 may collectively reduce the quality of the already selected participant images.

In another example, when the total size of the available network bandwidth increases from the current size, each time the quality controller 138 selects the participant image, the quality controller 138 may determine whether the size of the network usage bandwidth estimated when the quality of the already selected participant images is increased satisfies the quality change condition that corresponds to the changed performance of the network. For example, assuming that the total size of the available network bandwidth increases from 1.3 Mbps to 1.8 Mbps, each time the quality controller 138 selects the participant image, the quality controller 138 may determine whether the size of the network usage bandwidth estimated when the quality of the already selected participant images is increased satisfies the first condition (i.e., whether the estimated size of the network usage bandwidth falls within 1.8 Mbps) and the second condition (i.e., whether the estimated size of the network usage bandwidth is greater than or equal to 1.3 Mbps that is 0.5 Mbps less than 1.8 Mbps). In the above example, when the estimated size of the network usage bandwidth is 1.2 Mbps, the size of the network usage bandwidth does not satisfy the quality change condition (i.e., the second condition), and thus the quality controller 138 may additionally select another participant image (e.g., the next participant image of the last selected participant image) and then newly estimate the size of the network usage bandwidth that would be obtained when the quality of the already selected participant images is increased. As such, when the newly estimated size of the network usage bandwidth is 1.5 Mbps, the size of the network usage bandwidth satisfies the quality change conditions, the quality controller 138 may collectively increase the quality of the already selected participant images.

That is, the quality controller 139 does not collectively change the quality of all the participant images, but may calculate a priority score of each participant image and collectively change the quality of some of the participant images by taking into consideration changed performance of the network and the priority score each time the network performance changes.

In this case, the priority score may be calculated based on one or more the above-described image information, speech information, and quality information of the participant image. The quality controller 138 may calculate the priority score for each participant image by adding, for example, a score of the image information, a score of the speech information, and a score of the quality information for each participant image.

For example, the priority score may be calculated by Equation 1 below.

$$\text{Priority score} = \alpha \cdot \text{score of image information} + \beta \cdot \text{score of speech information} + \gamma \cdot \text{score of quality information} \quad \text{[Equation 1]}$$

(here, $\alpha$, $\beta$, and $\gamma$ are coefficients each having a set value.)

In one example, in the case of a participant image having a large number of participant faces included therein, the visual recognition rate may decrease when the quality of the participant image is reduced. Thus, the more the participant faces is included in the participant image, the higher a score of the image information may be calculated.

In another example, in the case of an image having a small ratio of a size of a participant face included in the participant image to the total size of the participant image, the visual recognition rate may decrease. Thus, the smaller the ratio of the size of the participant face included in the participant image to the total size of the participant image is, the higher the score of the image information may be calculated.

In another example, in the case of a participant image having a higher degree of movement compared to a stationary participant image, the visual recognition rate may decrease. Thus, the higher the degree of movement in the participant image is, the higher a score of the image information may be calculated.

In another example, if a participant included in the participant image is currently uttering, more attention may be paid as compared to when the participant is not uttering, and thus when the participant included in the participant image is currently uttering, a score of the speech information may be calculated higher.

In another example, a participant image having a relatively higher utterance frequency during conference attendance may be paid more attention to as compared to the otherwise participant image. Therefore, the higher the speech frequency of the participant included in the participant image is, the higher a score of the speech information may be calculated.

In another example, in the case of a participant image having a relatively low quality (e.g., resolution), the visual recognition rate may be low compared to a participant image having a relatively high quality. Thus, the lower the quality of the participant image is, the higher a score of the quality information may be calculated.

As such, the priority score may be calculated based on one or more of the image information, speech information, and quality information of the participant image, but the method of calculating the priority score described above is merely one example and is not limited thereto. The quality controller 138 may calculate the image information score, the speech information score, and the quality information score using a method different from the aforementioned method, and a method of calculating the priority score by combining the image information score, the speech information score, and the quality information score is not particularly limited. Also, for convenience of description, the priority score of the participant image whose quality needs to be increased is described as being calculated first. However, this is merely an example, and the reverse is equally possible.

Figure 2:
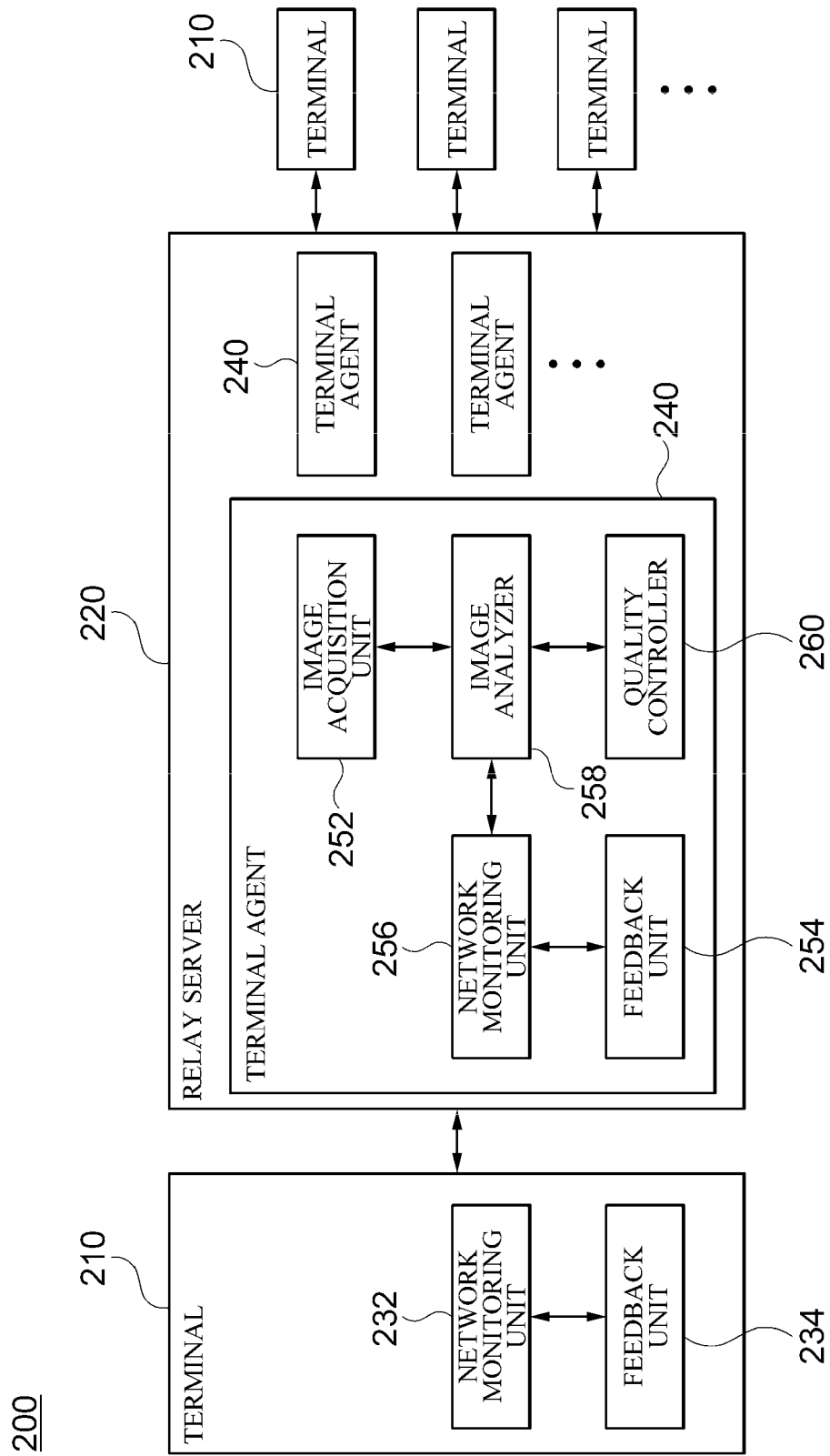
FIG. 2 is a block diagram illustrating a detailed configuration of a conference system according to a second embodiment of the present invention.

FIG. 2 is a block diagram illustrating a detailed configuration of a conference system 200 according to the second embodiment of the present invention. The conference system 200 according to the second embodiment of the present invention includes a plurality of terminals 210 and a relay server 220, as in the first embodiment. The conference system 200 according to the second embodiment of the present invention is substantially the same as the above-described first embodiment except that the quality of participant images is adjusted by the relay server 220, rather than by the terminals 210.

Hereinafter, components corresponding to the components of the first embodiment of the present invention described with reference to FIG. 1 perform the same or similar functions as those described in the first embodiment, and thus detailed descriptions thereof will be omitted.

Referring to FIG. 2, each of the terminals 210 includes a network monitoring unit 232 and a feedback unit 234.

The network monitoring unit 232 measures the size of network usage bandwidth of the terminal 210.

The feedback unit 234 may transmit information on the size of network usage bandwidth measured by the network monitoring unit 232 to the relay server 220.

The relay server 220 may include a plurality of terminal agents 240 corresponding to the respective terminals 210 and each of the terminal agents 240 may transmit and receive data to and from the terminal 210. In addition, each of the terminal agents 240 may include an image acquisition unit 252, a feedback unit 254, a network monitoring unit 256, an image analyzer 258, and a quality controller 260.

The image acquisition unit 252 acquires each participant image received from a plurality of terminals 210 connected to a conference. Each of the terminal agents 240 may receive a participant image of the corresponding terminal 210 from the terminal 210. The image acquisition unit 252 may collect all the participant images by receiving the participant image of each of the other terminals 210 from the other terminal agents 240.

The feedback unit 254 receives the information on the size of the network usage bandwidth of the terminal 210 from the terminal 210.

The network monitoring unit 256 may collect information on the network usage bandwidths of the other terminals 210 and monitor the performance of a network. Here, the performance of the network may be, for example, a total size of available network bandwidth.

When the performance of the network changes, the image analyzer 258 analyzes each participant image to acquire one or more of image information, speech information, and quality information of the each participant image.

The quality controller 260 changes the quality of at least some of the participant images according to the analysis result of the each participant image. As described above, the quality controller 260 may calculate a priority score of each participant image according to the analysis result of the each participant image and change the quality of at least some of the participant images according to the priority scores. Specifically, the quality controller 260 may sort the respective participant images according to the priority scores and select one or more participant images according to the sorted order. In addition, each time the quality controller 260 selects the participant image, the quality controller 260 may determine whether the size of the network usage bandwidth estimated when the quality of the already selected participant images is changed satisfies a quality change condition that corresponds to the changed performance of the network, and may change the quality of at least some of the participant images according to the determination result.

Figure 3:
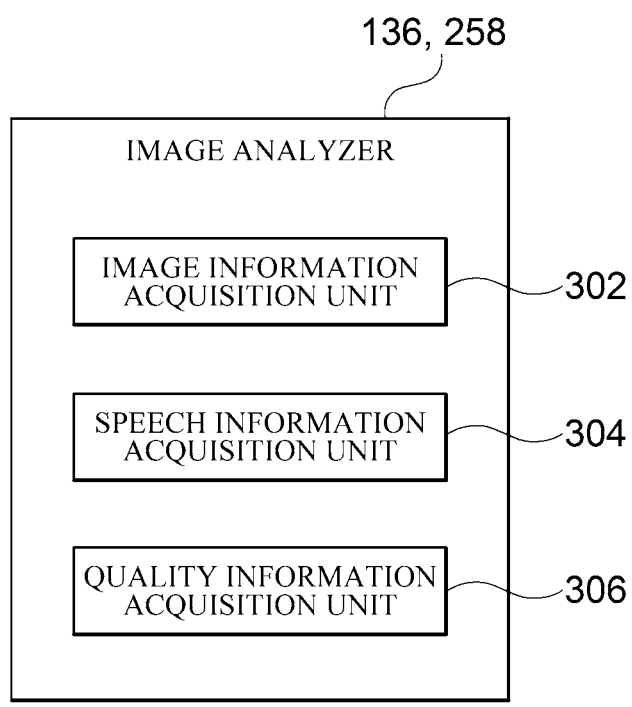
FIG. 3 is a block diagram illustrating a detailed configuration of an image analyzing unit according to the embodiments of the present invention.

FIG. 3 is a block diagram illustrating a detailed configuration of the image analyzer 136 and 258 according to the embodiments of the present invention. As shown in FIG. 3, the image analyzer 136 and 258 according to the embodiments of the present invention includes an image information acquisition unit 302, a speech information acquisition unit 304, and a quality information acquisition unit 306.

The image information acquisition unit 302 analyzes each participant image to acquire image information of the each participant image. As described above, the image information may include, for example, one or more of the number of participant faces included in the participant image, a ratio of the size of the participant face included in the participant image to the total size of the participant image, and the degree of movement of the participant image.

The speech information acquisition unit 304 analyzes each participant image to acquire speech information of each participant image. As described above, the speech information may include, for example, one or more of whether a participant included in the participant image is currently uttering and an utterance frequency of a participant included in the participant image while a terminal corresponding to the participant image is connected to the conference.

The quality information acquisition unit 306 analyzes each participant image to acquire quality information of the each participant image. As described above, the quality information may include, for example, a resolution of each participant image.

Figure 4:
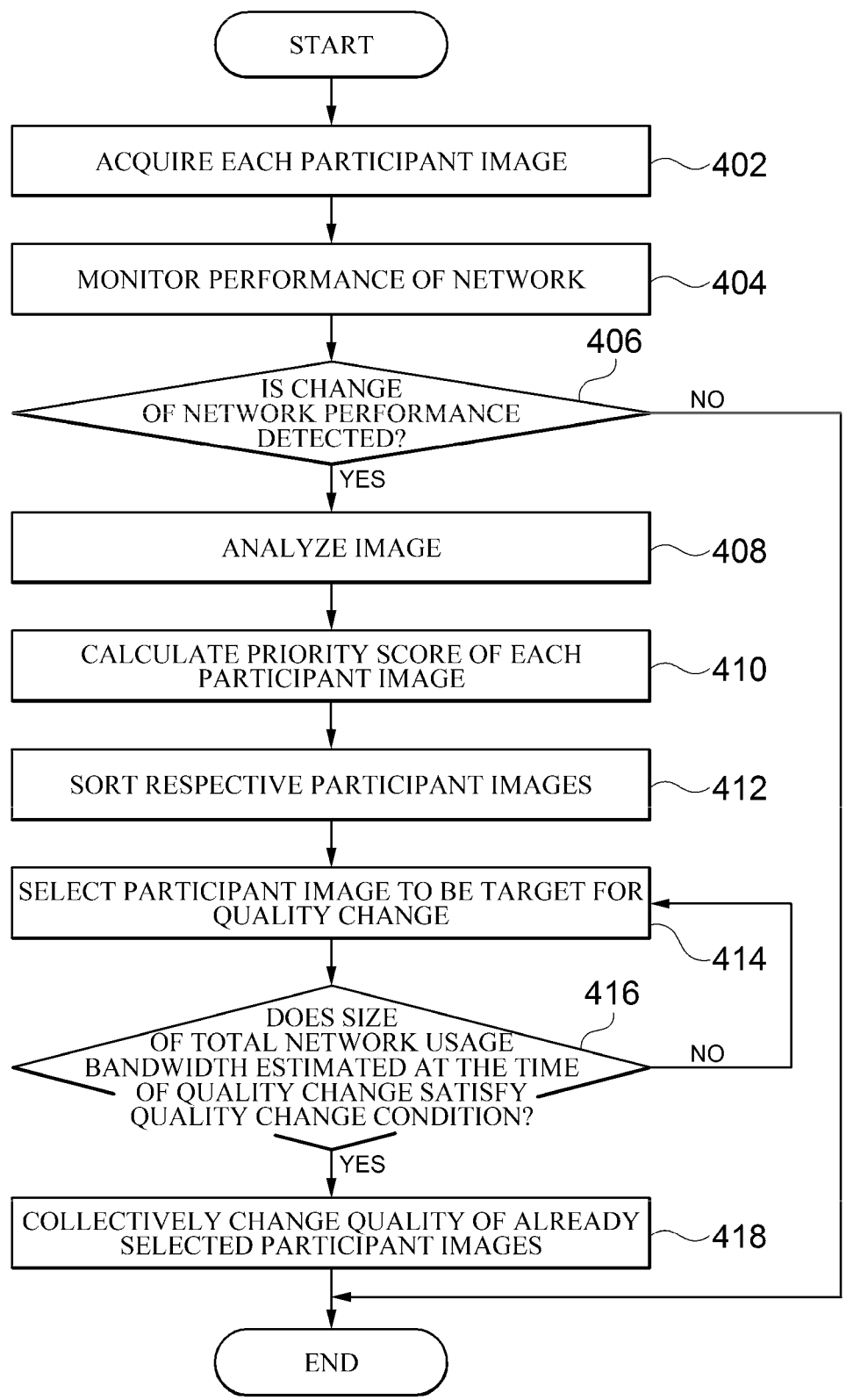
FIG. 4 is a flowchart for describing a method of adjusting image quality according to one embodiment of the present invention.

FIG. 4 is a flowchart for describing a method of adjusting image quality according to one embodiment of the present invention. In the illustrated flowchart, the process is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation 402, an image acquisition unit 132 or 252 acquires each participant image photographed by a plurality of terminals 110 or 210 connected to a conference.

In operation 404, a network monitoring unit 134 or 256 monitors the performance of a network.

In operation 406, the network monitoring unit 134 or 256 monitors whether the performance of the network has changed.

In operation 408, when it is detected that the performance of the network has changed in operation 406, an image analyzer 136 or 258 analyzes each participant image to acquire one or more of image information, speech information, and quality information of the each participant image.

In operation 410, a quality controller 138 or 260 calculates a priority score of the each participant image according to the analysis result of the each participant image.

In operation 412, the quality controller 138 or 260 sorts the respective participant images according to the priority scores.

In operation 414, the quality controller 138 or 260 selects a participant image to be a target for quality change from among a plurality of participant images. Specifically, the quality controller 138 or 260 may select one or more participant images according to the sorted order.

In operation 416, each time the quality controller 138 or 260 selects the participant image, the quality controller 138 or 260 determines whether the size of network usage bandwidth estimated when the quality of the already selected participant images is changed satisfies a quality change condition that corresponds to the changed performance of the network.

In operation 418, the quality controller 138 or 260 collectively changes the quality of the already selected participant images when it is determined that the estimated size of the network usage bandwidth satisfies the quality change condition that corresponds to the changed performance of the network. If it is determined that the estimated size of the network usage bandwidth does not satisfy the quality change condition that corresponds to the changed performance of the network, the quality controller 138 or 260 may return to operation 414 and additionally select another participant image (e.g., the next participant image of the last selected participant image).

Figure 5:
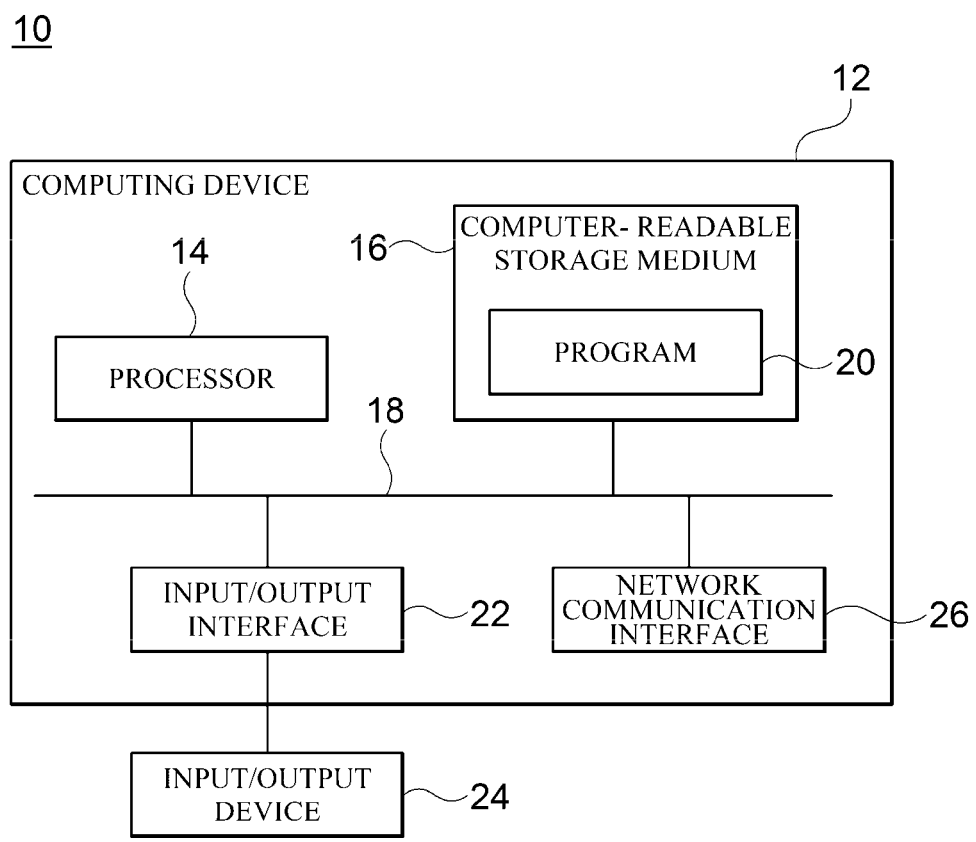
FIG. 5 is a block diagram for describing an example of a computing environment including a computing device suitable to be used in exemplary embodiments.

FIG. 5 is a block diagram for describing an example of a computing environment 10 including a computing device suitable to be used in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be the terminal 110 or 210 or the relay server 120 or 220. The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the exemplary embodiment.

The computer readable storage medium 16 is configured to store computer executable commands and program codes, program data and/or information in other suitable forms. The programs stored in the computer readable storage medium 16 may include a set of commands executable by the processor 14. In one embodiment, the computer readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

Meanwhile, the embodiment of the present invention may include programs for performing the methods described herein on a computer and computer-readable recording media including the programs. The computer-readable recording media may include, alone or in combination with, program commands, local data files, local data structures and the like. The media may be specially designed and configured for the present invention, or known and available to those of ordinary skill in the field of computer software. Examples of the computer-readable recording media include magnetic media, such as hard disks, floppy disks, and magnetic tapes, optical recording media, such as CD-ROM disks and DVDs, magneto-optical media, such as floptical disks, and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

While representative embodiments of the preset invention have been described above in detail, it may be understood by those skilled in the art that the embodiments may be variously modified without departing from the scope of the present invention. Therefore, the scope of the present invention is defined not by the described embodiment but by the appended claims, and encompasses equivalents that fall within the scope of the appended claims.

The invention claimed is:

1. A terminal for connecting to a conference via a network, the terminal comprising:
an image acquisition unit configured to acquire each participant image received from a plurality of other terminals connected to the conference;
a network monitoring unit configured to monitor performance of the network;
an image analyzer configured to analyze the each participant image to acquire one or more of image information, speech information, and quality information of the each participant image when the performance of the network changes; and
a quality controller configured to change quality of at least some of the participant images according to an analysis result of the each participant image.

2. The terminal of claim 1, wherein the performance of the network is a size of total available network bandwidth.

3. The terminal of claim 1, wherein the quality controller selects one or more of the participant images using the analysis result of the each participant image, determines whether a size of network usage bandwidth estimated when a quality of the selected participant image is changed satisfies a quality change condition that corresponds to the changed performance of the network, and changes the quality of at least some of the participant images according to the determination result.

4. The terminal of claim 3, wherein the quality controller calculates a priority score of the each participant image according to the analysis result of the each participant image and selects the one or more participant images according to the priority scores.

5. The terminal of claim 3, wherein the quality controller additionally selects another participant image when the size of the network usage bandwidth does not satisfy the quality change condition, and collectively changes the quality of already selected participant images when the size of the network usage bandwidth satisfies the quality change condition.

6. The terminal of claim 1, wherein the image information includes one or more of a number of participant faces included in the participant image, a ratio of a size of a participant face included in the participant image to a total size of the participant image, and a degree of movement of the participant image.

7. The terminal of claim 1, wherein the speech information includes one or more of whether a participant included in the participant image is currently uttering and an utterance frequency of a participant included in the participant image.

8. A relay server for connecting via a network to a plurality of terminals for a connection to a conference, the relay server comprising:
- an image acquisition unit configured to acquire each participant image from the plurality of terminals connected to the conference;
- a network monitoring unit configured to acquire information on performance of the network;
- an image analyzer configured to analyze the each participant image to acquire one or more of image information, speech information, and quality information of the each participant image when the performance of the network changes; and
- a quality controller configured to change quality of at least some of the participant images according to an analysis result of the each participant image.

9. The relay server of claim 8, wherein the performance of the network is a size of total available network bandwidth.

10. The relay server of claim 8, wherein the quality controller selects one or more of the participant images using the analysis result of the each participant image, determines whether a size of network usage bandwidth estimated when a quality of the selected participant image is changed satisfies a quality change condition that corresponds to the changed performance of the network, and changes the quality of at least some of the participant images according to the determination result.

11. The relay server of claim 10, wherein the quality controller calculates a priority score of the each participant image according to the analysis result of the each participant image and selects the one or more participant images according to the priority scores.

12. The relay server of claim 10, wherein the quality controller additionally selects another participant image when the size of the network usage bandwidth does not satisfy the quality change condition, and collectively changes the quality of already selected participant images when the size of the network usage bandwidth satisfies the quality change condition.

13. The relay server of claim 8, wherein the image information includes one or more of a number of participant faces included in the participant image, a ratio of a size of a participant face included in the participant image to a total size of the participant image, and a degree of movement of the participant image.

14. The relay server of claim 8, wherein the speech information includes one or more of whether a participant included in the participant image is currently uttering and an utterance frequency of a participant included in the participant image.

15. A method of adjusting image quality, which is performed in a terminal connected to a conference via a network, the method comprising:
- acquiring each participant image received from a plurality of other terminals connected to the conference;
- monitoring performance of the network;
- analyzing the each participant image to acquire one or more of image information, speech information, and quality information of the each participant image when the performance of the network changes; and
- changing quality of at least some of the participant images according to an analysis result of the each participant image.

16. The method of claim 15, wherein the performance of the network is a size of total available network bandwidth.

17. The method of claim 15, wherein the changing of the at least some of the participant images comprises selecting one or more of the participant images using the analysis result of the each participant image, determining whether a size of network usage bandwidth estimated when a quality of the selected participant image is changed satisfies a quality change condition that corresponds to the changed performance of the network, and changing the quality of at least some of the participant images according to the determination result.

18. The method of claim 17, wherein the selecting of the participant images one by one calculates a priority score of the each participant image according to the analysis result of the each participant image and selects the one or more participant images according to the priority scores.

19. The method of claim 17, wherein the changing of the quality of at least some of the participant images according to the determination result additionally selects another participant image when the size of the network usage bandwidth does not satisfy the quality change condition, and collectively changes the quality of already selected participant images when the size of the network usage bandwidth satisfies the quality change condition.

20. The method of claim 15, wherein the image information includes one or more of a number of participant faces included in the participant image, a ratio of a size of a participant face included in the participant image to a total size of the participant image, and a degree of movement of the participant image.

21. The method of claim 15, wherein the speech information includes one or more of whether a participant included in the participant image is currently uttering and an utterance frequency of a participant included in the participant image.

22. A method of adjusting image quality, which is performed by a relay server connected via a network to a plurality of terminals for a connection to a conference, the method comprising:
- acquiring each participant image from the plurality of terminals connected to the conference;
- acquiring information on performance of the network;
- analyzing the each participant image to acquire one or more of image information, speech information, and quality information of the each participant image when the performance of the network changes; and
- changing quality of at least some of the participant images according to an analysis result of the each participant image.

23. The method of claim 22, wherein the performance of the network is a size of total available network bandwidth.

24. The method of claim 22, wherein the changing of the at least some of the participant images comprises selecting one or more of the participant images using the analysis result of the each participant image, determining whether a size of network usage bandwidth estimated when a quality of the selected participant image is changed satisfies a quality change condition that corresponds to the changed performance of the network, and changing the quality of at least some of the participant images according to the determination result.

25. The method of claim 24, wherein the selecting of the participant images one by one calculates a priority score of the each participant image according to the analysis result of the each participant image and selects the one or more participant images according to the priority scores.

26. The method of claim 24, wherein the changing of the quality of at least some of the participant images according to the determination result additionally selects another participant image when the size of the network usage bandwidth does not satisfy the quality change condition, and collectively changes the quality of already selected participant images when the size of the network usage bandwidth satisfies the quality change condition.

27. The method of claim 22, wherein the image information includes one or more of a number of participant faces included in the participant image, a ratio of a size of a participant face included in the participant image to a total size of the participant image, and a degree of movement of the participant image.

28. The method of claim 22, wherein the speech information includes one or more of whether a participant included in the participant image is currently uttering and an utterance frequency of a participant included in the participant image.

* * * * *